United States Patent [19]

Coffey

[11] Patent Number: 5,200,596
[45] Date of Patent: Apr. 6, 1993

[54] TRIP ODOMETER ASSEMBLY
[75] Inventor: Gregg S. Coffey, Linden, Mich.
[73] Assignee: Delco Electronics Corporation, Kokomo, Ind.
[21] Appl. No.: 889,536
[22] Filed: May 27, 1992
[51] Int. Cl.[5] .................. G06C 25/00; G06C 15/42
[52] U.S. Cl. ..................... 235/131 FD; 235/144 R; 235/144 SP
[58] Field of Search ............... 235/95 R, 96, 131 FD, 235/131 JA, 139 A, 139 R, 135, 144 B, 144 SP

[56] References Cited

U.S. PATENT DOCUMENTS

| | | | |
|---|---|---|---|
| 579,115 | 3/1897 | Little | 235/139 R |
| 591,761 | 10/1897 | Hart | 235/95 R |
| 764,778 | 7/1904 | Staude | 235/131 FD |
| 1,734,399 | 11/1929 | Primbs, Jr. | 235/131 JA |
| 3,756,088 | 9/1973 | Inoue | 74/89.17 |
| 3,756,506 | 9/1973 | Inoue | 235/95 |
| 3,866,021 | 2/1975 | Kessler | 235/92 |
| 3,871,713 | 3/1975 | Lister | 303/6 C |
| 3,945,563 | 3/1976 | Inoue | 235/96 |
| 4,015,109 | 3/1977 | Deming | 235/96 |
| 4,098,072 | 7/1978 | Brouwer | 58/125 |
| 4,106,204 | 8/1978 | Schader | 33/147 |
| 4,970,377 | 11/1990 | Corcoran | 235/96 |
| 4,970,378 | 11/1990 | Bleicher | 235/96 |
| 5,122,642 | 6/1992 | Herrmann | 235/144 SP |

Primary Examiner—Michael L. Gellner
Assistant Examiner—Eddie C. Lee
Attorney, Agent, or Firm—Anthony L. Simon

[57] ABSTRACT

For a trip odometer comprising a pinion carrier and a pinion spring mounted to the pinion carrier, the improvement provided includes, on the pinion carrier, a mating surface having a thickness, two protruding locators and an underside surface, wherein each locator has a retention ramp operatively associated with the pinion spring to retain the pinion spring in a secured position. Improvement on the pinion spring comprises (a) a mounting surface, (b) a leader ramp formed at a first end of the mounting surface, (c) a second end of the mounting surface, opposite from the first end, forming acute bends and finger bends, (d) a series of leaf springs extending out of the acute bends operatively associated with the transfer gears, (e) the finger bends being interposed between the leaf springs (f) arcuate extensions protruding from the finger bends and arcing towards the mounting surface, (g) retention springs formed from the arcuate extensions, (h) bends located at the end of the retention springs, bending away from the mounting surface to form spring ramps, and (i) two locating holes defined by the mounting surface, the locators protruding through the locating holes, whereby the improvements allow self-guided one step assembly of the pinion spring to the pinion carrier.

3 Claims, 3 Drawing Sheets

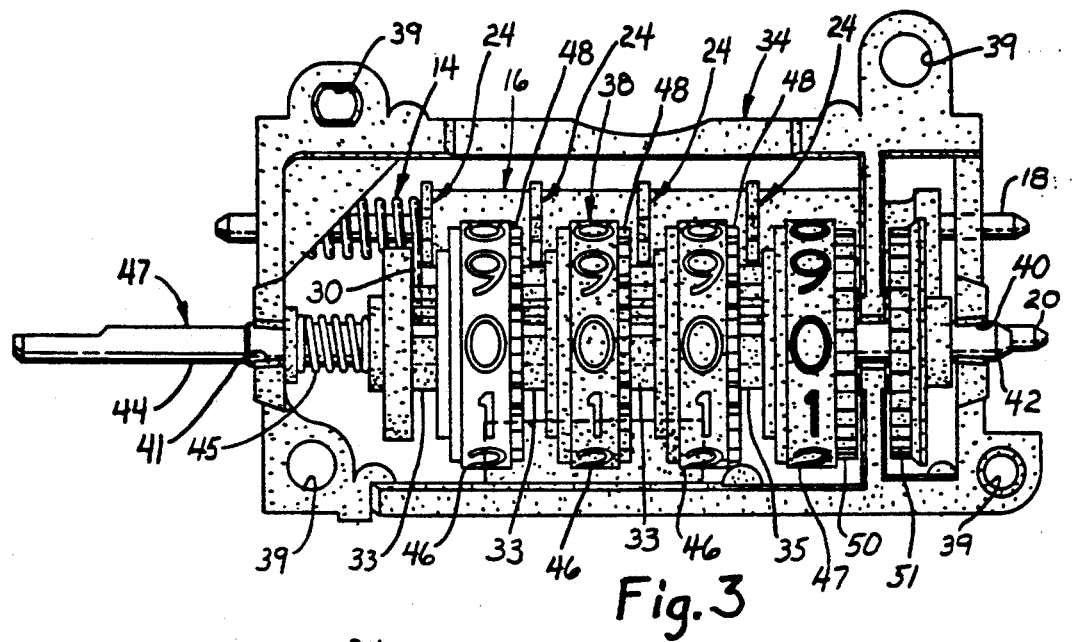
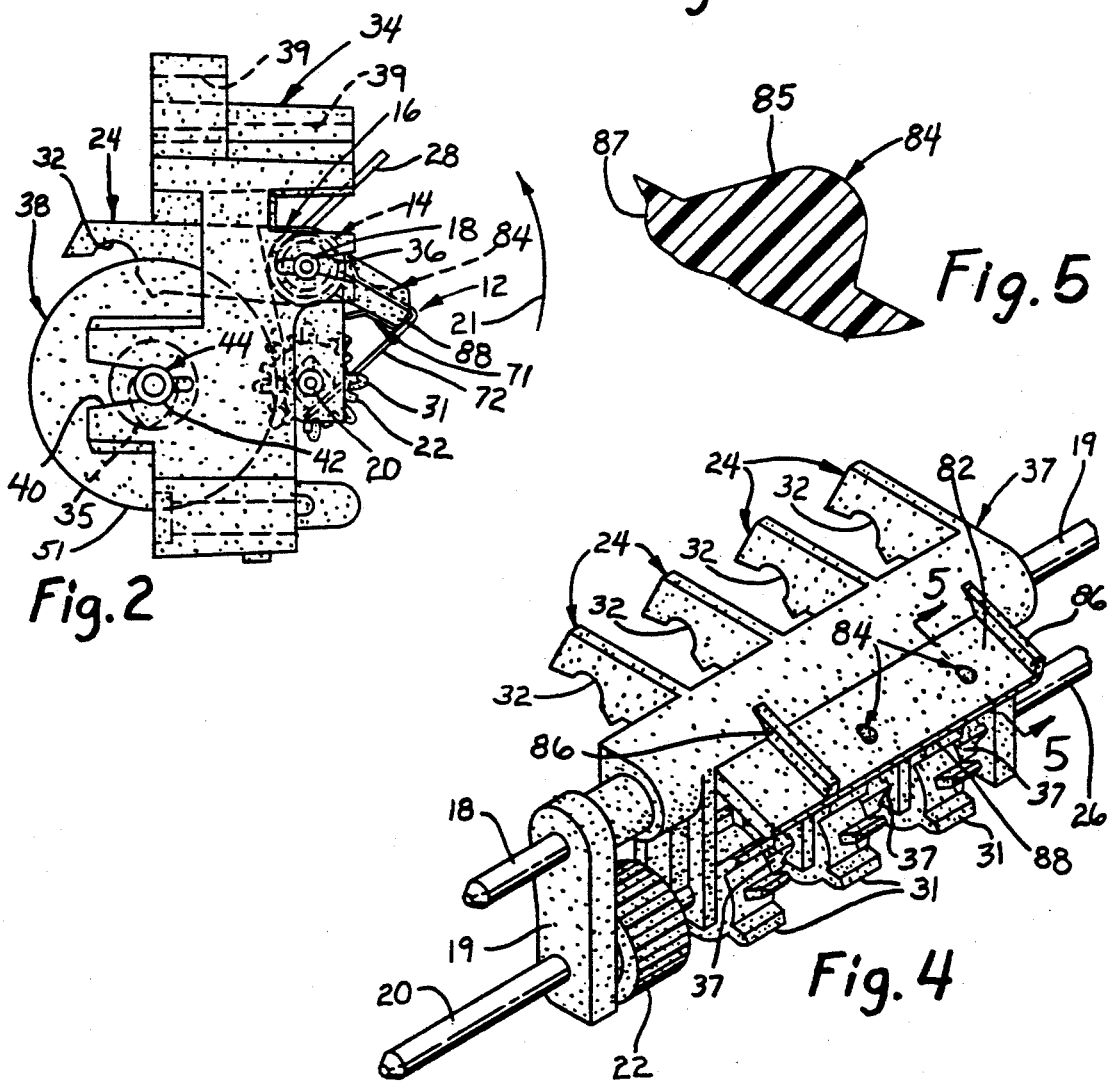

TRIP ODOMETER ASSEMBLY

This invention relates to vehicle instrumentation display devices and more particularly to a trip odometer assembly for vehicle instrumentation.

BACKGROUND OF THE INVENTION

Many vehicle instrumentation panels include trip odometers capable of providing the vehicle operator with a measure of vehicle distance traveled since the odometer has been reset. Trip odometers can be intricate, requiring several parts to perform the functions of keeping track of miles traveled and resetting when a button is depressed. What is desired is a trip odometer that provides high reliability and performance at a reduced cost.

SUMMARY OF THE PRESENT INVENTION

This invention provides a trip odometer assembly that is easy to assemble and provides a reduced part count over typical prior art trip odometer devices. Advantageously, the apparatus of this invention can be assembled with less manufacturing steps than typical prior art devices. Advantageously, the reduced number of parts required by this invention offers a cost savings in the manufacture of the device.

Structurally, the trip odometer assembly comprises a mounting bracket, a trip odometer wheel assembly rotatably mounted within the mounting bracket, a pinion carrier, including transfer gears, pivotably mounted in the mounting bracket and a pinion spring mounted to the pinion carrier. The improvement includes, for the pinion carrier, a mating surface having a thickness and two protruding locators and comprising an underside surface. Each locator has a retention ramp operatively associated with the pinion spring to retain the pinion spring in a secured position. The improvement for the pinion spring comprises (a) a mounting surface, (b) a leader ramp formed at a first end of the mounting surface for guiding the mounting surface over the mating surface of the pinion carrier and for guiding the mounting surface over the locators enabling engagement of the locators and the pinion spring, (c) a second end of the mounting surface, opposite from the first end, forming acute bends and finger bends, (d) a series of leaf springs extending out of the acute bends operatively associated with the transfer gears, (e) the finger bends being interposed between the leaf springs, (f) arcuate extensions protruding from the finger bends and arcing towards the mounting surface, (g) retention springs formed from the arcuate extensions for operatively engaging with the underside surface, the retention springs having a free state extension from the mounting surface less than the thickness of the mating surface, (h) bends located at the end of the retention springs, bending away from the mounting surface to form spring ramps for guiding the springs to the underside surface, and (i) two locating holes defined by the mounting surface, the locators protruding through the locating holes, whereby the improvements allow self-guided one step assembly of the pinion spring to the pinion carrier.

A more detailed description of this invention, along with various advantages thereof is set forth below.

BRIEF DESCRIPTION OF THE DRAWINGS

FIG. 2 is a side view of the trip odometer assembly of this invention.

FIG. 3 is a front view of the trip odometer assembly of this invention.

FIG. 4 is a view of the pinion carrier.

FIGS. 5, 6 and 7 are views of the pinion spring.

DETAILED DESCRIPTION OF THE INVENTION

Figure 1:
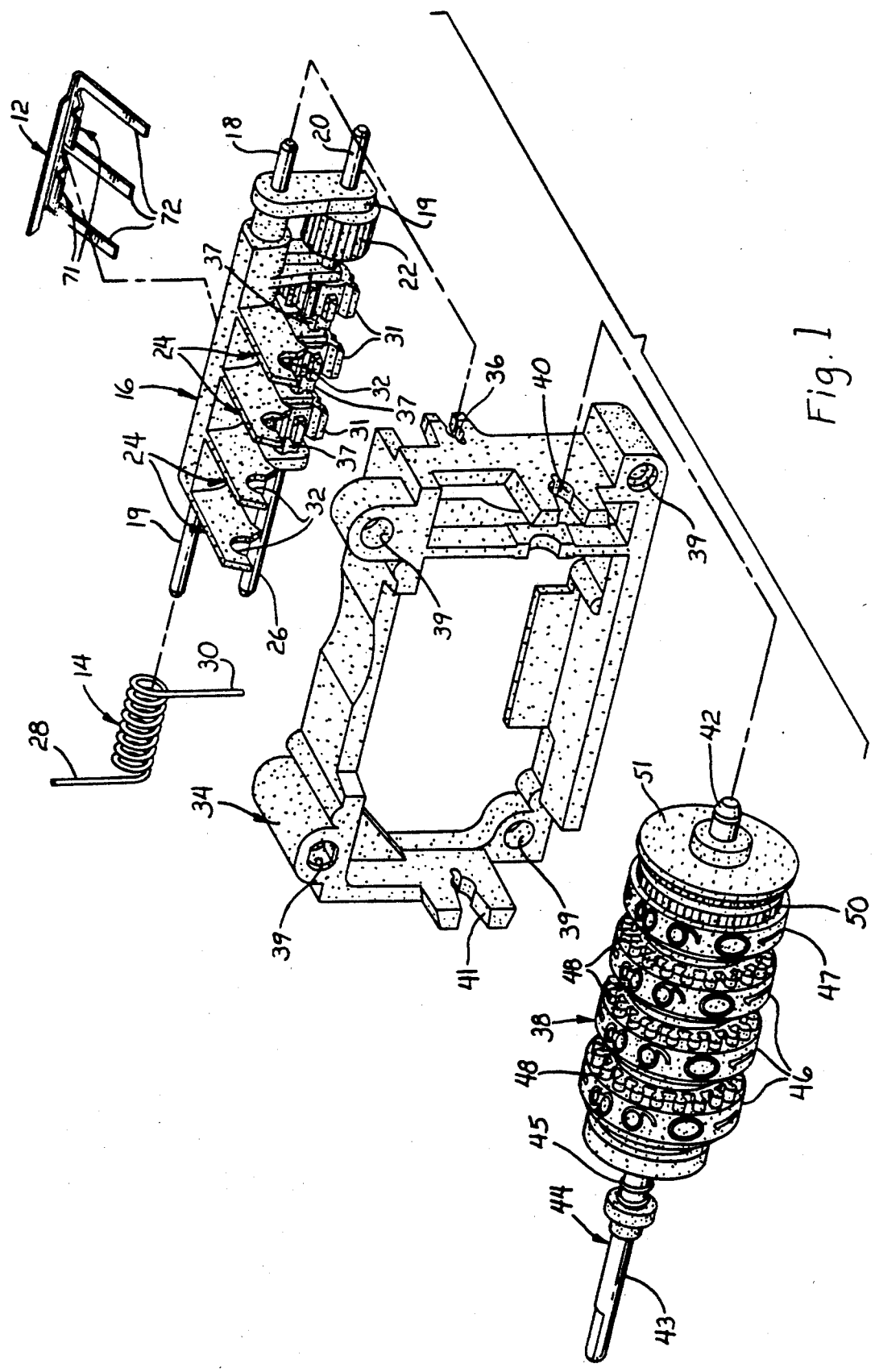
FIG. 1 is an exploded view of the trip odometer assembly of this invention.

Referring to FIG. 1, mounting bracket 34, of a type commonly known to those skilled in the art, includes four holes 39, rotatable mounts 40 and 41 and pivotable mounts 36 (only one shown). The mounting holes 39 are used for mounting the assembly in a motor vehicle instrumentation housing by a means such as mounting screws (not shown).

Odometer wheel assembly 38, of a type commonly known to those skilled in the art, includes shaft 44, mileage wheels 46, decimal wheel 47 and drive gear 51. Each of the mileage wheels 46 has a cam 33 (FIG. 3) and a gear 48 and the decimal wheel 47 has a cam 35 (FIG. 3) and gear 50 as shown. Odometer wheel assembly 38 is rotatably mounted to mounting bracket 34 by operative association of ends 42 and 43 of shaft 44 within rotatable mounts 40 and 41.

Pinion carrier 16 has a pivotable mounting shaft 18, arms 24 having cam slots 32, decimal transfer gear 22, and mileage transfer gears 31, all of the gears mounted on shaft 20. The pinion carrier is pivotably mounted in the mounting bracket 34 by operative association of pivotable mounting shaft 18 within pivotable mounts 36. In a normal position of pinion carrier 16, decimal transfer gear 22 transfers rotational motion from drive gear 51 to gear 50 on decimal wheel 47 and mileage transfer gears 31 engage the gears 48 of the mileage wheels 46 to transfer rotational motion to the mileage wheels, operating the mileage wheels in a manner well known to those skilled in the art to indicate trip mileage. When the pinion carrier 16 is in the normal position, cam slots 32 do not engage with cams 33 and 35.

When the pinion carrier 16 is pivoted about an axis of shaft 18 to a reset position, decimal transfer gear 22 and mileage transfer gears 31 disengage from the mileage wheels 46 and decimal wheel 47. When pivoting into the reset position, cam slots 32, of which one corresponds to each cam 33, 35, engage cams 33 and 35, resetting the wheels 46 and 47 to a predetermined position corresponding to 000.0 trip miles, thus resetting the trip odometer. In a manner well known to those skilled in the art, the shape of the cam slots 32 matches an associated shape of the cams 33, 35 so that the predetermined position is consistently repeatable.

Wound spring 14 fits over end 19 of shaft 18, with end 30 pressing against shaft 26 and end 14 pressing against bracket 34 to bias the pinion carrier 16 in the normal position.

Pinion spring 12, explained in further detail below, is mounted to pinion carrier 16 and has leaf springs 72 resting against cam gears 37, biasing the cam gears 37 and gears 31 into one of several predetermined positions when no transfer force is applied to gears 31.

A side view of the trip odometer assembly in the normal position is shown in FIG. 2. The reset position is obtained by application of force against shaft 20, forcing pinion carrier to pivot in the direction of arrow 31, engaging cam slots 32 with cams 33, 35.

FIG. 3 shows a frontal view of the trip odometer assembly in the normal position.

Referring to FIG. 4, the view of the pinion carrier 16 shown shows improvements provided by this invention. The portion of the pinion carrier 16 to which pinion spring 12 is mounted includes mating surface 82, protruding locators 84 and locating walls 86. A side view of the protruding locators 84 is shown in FIG. 5, with each protruding locator 84 including a ramp 85 on the side of the locator 84 closest to the arms 24. The purpose of the ramps 85 will be explained further below.

Figure 6:
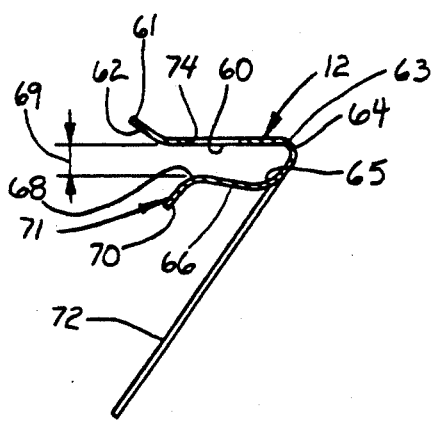
Figure 7:
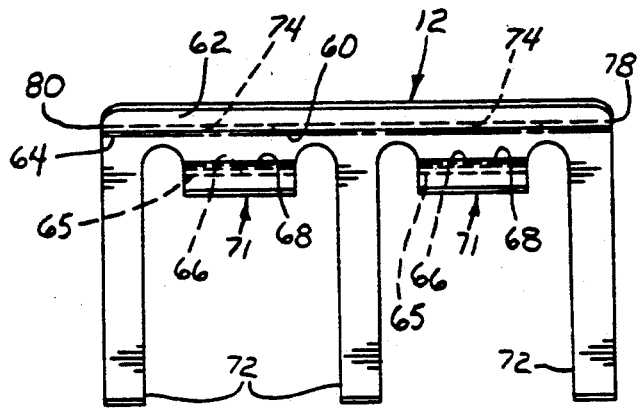
Figure 8:
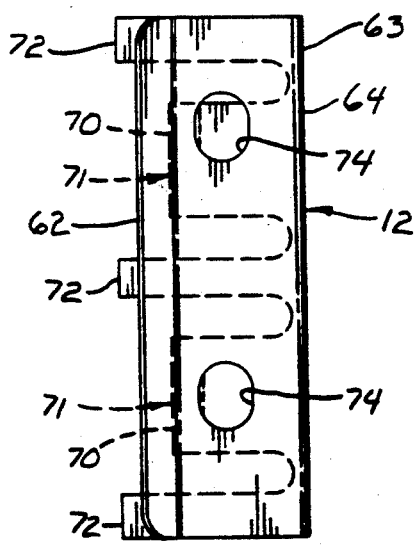
FIG. 8 is a view of a locator on the pinion carrier.

Referring to FIGS. 6, 7 and 8, the three different shown views illustrate with detail the pinion spring 12. An example material for pinion spring 12 is full hard 301 stainless steel, substantially 0.006 inches thick. The pinion spring 12 has mounting surface 60, being formed into leader ramp 62 at a first end 61 thereof as shown. During assembly, leader ramp 62 guides the mounting surface 62 over the mating surface 82 of the pinion carrier 16 and guides the mounting surface 62 over the locators 84 enabling engagement of the locators 84 and the pinion spring 12. At a second end 63 of mounting surface 60, on an opposite side of mounting surface 60 from first end 61, acute bend 64 is formed out of which extend a series of leaf springs 72 as shown.

Also formed at the second end 63 of the mounting surface 60 are two finger bends 65 interposed between the leaf springs 72. The finger bends 65 round out into arcuate extensions 66 as shown, arching towards the mounting surface 60. Arcuate extensions 66 form retention springs 71, having a free state extension from the mounting surface 62, the free state extension indicated by distance 69, less than the thickness of the mating surface, which is indicated by the thickness of edge 88 (FIG. 4). The retention springs 71 end in bends 68, arcing away from mounting surface 60, to form ramps 70 for guiding the springs to the underside surface 87 of the mating surface 82.

FIG. 8 shows two locating holes 74, 76, which may be slightly elongated along the axis perpendicular to sides 78 and 80 to allow for variations due to manufacturing tolerances. The distance between hole 76 and side 80 may be shorter than the distance between hole 74 and side 78.

Figure 9:
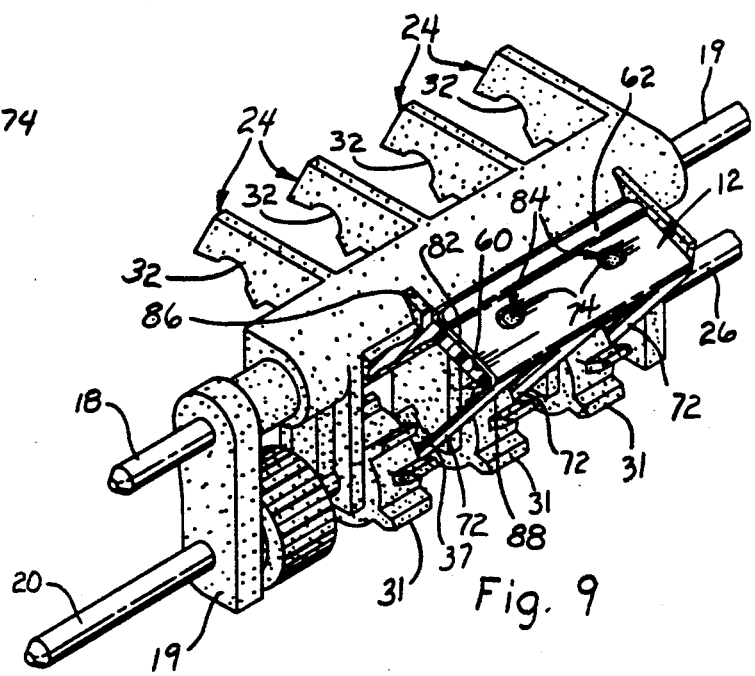
FIG. 9 is a view of the pinion carrier and the pinion spring mounted therein.

Referring to FIG. 9, when pinion spring 12 is fixedly engaged with pinion carrier 16, mounting surface 60 rests substantially against mating surface 82 and locators 84 protrude through locating holes 74 and 76 in the pinion spring. Locators 84 together with locating holes 74 and 76 locate the spring 12 in place, and pinion spring 12 is held in place through retention springs 71, applying pressure against the underside of mating surface 82. The retention ramps 85 of the locators 84 apply a cam type force in the direction of arrow 87 (FIG. 5) on pinion spring 12, acting to securely retain pinion spring 12 in place.

In an advantage provided by this invention, assembly of pinion spring 12 to pinion carrier 16 is achieved in one manufacturing step. The pinion spring 12 is placed at edge 88 of pinion carrier 16, with the leader ramp 62 facing edge 88 and slid into place until locators 84 snap into locating holes 74 and 76. Guide walls 86, molded into the pinion carrier 16 on either side of mating surface 82, as shown, guide pinion spring 12 properly in place as it is being slid onto pinion carrier 16, providing integral location of the leaf springs 72 with respect to cam gears 37.

The distance between one of the locators 84 and one of the side walls 86 may be different from the distance between the other of the locators 84 and the other side wall 86 and may correspond to like distances between locating hole 74 and side 78 and between locating hole 76 and side 80. Providing these unequal distances helps ensure proper positioning of the pinion spring 12 with respect to pinion carrier 16 and helps prevent improper assembly of parts.

The above described improvements of this invention allow self-guided one step assembly of the pinion spring to the pinion carrier. By eliminating extra parts required to retain pinion spring 12 on pinion carrier 16 and by eliminating manufacturing process steps in the assembly of pinion spring 12 to pinion carrier 16, this invention provides possible cost saving advantages.

The above description of this invention is an example implementation and various improvements and modifications to the above described implementation may occur to those skilled in the art and fall within the scope of this invention as set forth below.

The embodiments of the invention in which an exclusive property or privilege is claimed are defined as follows:

1. In a trip odometer comprising a mounting bracket, a trip odometer wheel assembly rotatably mounted within the mounting bracket, a pinion carrier including transfer gears, pivotably mounted in the mounting bracket and a pinion spring mounted to the pinion carrier, the improvement wherein:

the pinion carrier comprises a mating surface having a thickness and two protruding locators and comprising an underside surface, wherein each locator has a retention ramp operatively associated with the pinion spring to retain the pinion spring in a secured position; and the pinion spring comprises
(a) a mounting surface,
(b) a leader ramp formed at a first end of the mounting surface for guiding the mounting surface over the mating surface of the pinion carrier and for guiding the mounting surface over the locators enabling engagement of the locators and the pinion spring,
(c) a second end of the mounting surface, opposite from the first end, forming acute bends and finger bends,
(d) a series of leaf springs extending out of the acute bends operatively associated with the transfer gears,
(e) the finger bends being interposed between the leaf springs
(f) arcuate extensions protruding from the finger bends and arching towards the mounting surface,
(g) retention springs formed from the arcuate extensions for operatively engaging with the underside surface, the retention springs having a free state extension from the mounting surface less than the thickness of the mating surface,
(h) bends located at the end of the retention springs, bending away from the mounting surface to form spring ramps for guiding the springs to the underside surface, and
(i) two locating holes defined by the mounting surface, the locators protruding through the locating holes, whereby the improvements allow self-guided one step assembly of the pinion spring to the pinion carrier.

2. The apparatus set forth in claim 1, wherein the mounting surface of the pinion spring has first and second sides perpendicularly to the first and second ends, and wherein one of the locating holes has a first distance from the first side shorter than a second distance between the other mounting hole and the second side, preventing misalignment of the pinion spring and pinion carrier.

3. The apparatus set forth in claim 1, wherein the pinion carrier includes guide walls on either side of the mating surface for guiding the pinion spring in place, providing integral location of the leaf springs with assembly of the pinion spring to the pinion carrier.

* * * * *